US011671456B2

(12) United States Patent
Dalal et al.

(10) Patent No.: US 11,671,456 B2
(45) Date of Patent: Jun. 6, 2023

(54) NATURAL LANGUAGE PROCESSING SYSTEMS AND METHODS FOR AUTOMATIC REDUCTION OF FALSE POSITIVES IN DOMAIN DISCOVERY

(71) Applicant: Proofpoint, Inc., Sunnyvale, CA (US)

(72) Inventors: Gaurav Mitesh Dalal, Fremont, CA (US); Hung-Jen Chang, Fremont, CA (US); Ali Mesdaq, San Jose, CA (US)

(73) Assignee: PROOFPOINT, INC., Sunnyvale, CA (US)

( * ) Notice: Subject to any disclaimer, the term of this patent is extended or adjusted under 35 U.S.C. 154(b) by 403 days.

(21) Appl. No.: 16/871,258

(22) Filed: May 11, 2020

(65) Prior Publication Data

US 2021/0067557 A1   Mar. 4, 2021

Related U.S. Application Data

(60) Provisional application No. 62/894,013, filed on Aug. 30, 2019.

(51) Int. Cl.
*H04L 9/40* (2022.01)
*G06F 16/2458* (2019.01)
(Continued)

(52) U.S. Cl.
CPC .......... *H04L 63/20* (2013.01); *G06F 16/2468* (2019.01); *G06F 40/237* (2020.01); *H04L 61/3005* (2013.01)

(58) Field of Classification Search
CPC . H04L 63/20; H04L 61/3005; G06F 16/2468; G06F 40/237
See application file for complete search history.

(56) References Cited

U.S. PATENT DOCUMENTS 10,880,330 B2 * 12/2020 Wang ...................... G06F 40/30
10,911,477 B1 *  2/2021 Kharraz ............ G06F 16/90344
(Continued)

FOREIGN PATENT DOCUMENTS

EP          2927825 A1      10/2015

OTHER PUBLICATIONS

McClosky, D. (2010). Any domain parsing: Automatic domain adaptation for natural language parsing (Order No. 3430199). Available from ProQuest Dissertations and Theses Professional. (763161237). Retrieved from https://dialog.proquest.com/professional/docview/763161237?accountid=131444 (Year: 2010).*

(Continued)

*Primary Examiner* — Patrice L Winder
*Assistant Examiner* — Angela M Widhalm de Rodriguez
(74) *Attorney, Agent, or Firm* — Sprinkle IP Law Group

(57) ABSTRACT

A rules engine is adapted for analyzing each match produced by a domain discovery system as matching a seed domain. Utilizing a natural language processing (NLP) library, the rules engine determines segments from the match, assigns a lexical category to each segment based on the context in how a seed domain string is used, and compares the lexical category of the segment that is closest to the seed domain string with a lexical category of the seed domain string. Based on the comparing, the rules engine determines whether the match is relevant to the seed domain and, if not, the match produced by the domain discovery system is identified as a false positive and automatically removed from a set of matches produced by the domain discovery system for the seed domain.

20 Claims, 4 Drawing Sheets

(51) Int. Cl.
  *G06F 40/237* (2020.01)
  *H04L 61/30* (2022.01)

(56) References Cited

U.S. PATENT DOCUMENTS

| | | | | |
|---|---|---|---|---|
| 11,157,539 | B2* | 10/2021 | Methani | G06F 16/353 |
| 2009/0049028 | A1 | 2/2009 | Senthil | |
| 2010/0114879 | A1* | 5/2010 | Zhong | G06F 40/295 |
| | | | | 707/723 |
| 2011/0047148 | A1* | 2/2011 | Omoigui | G06N 5/02 |
| | | | | 707/723 |
| 2015/0067867 | A1 | 3/2015 | Blake et al. | |
| 2016/0055490 | A1* | 2/2016 | Keren | G06Q 30/00 |
| | | | | 705/14.47 |
| 2016/0352772 | A1* | 12/2016 | O'Connor | H04L 63/1483 |
| 2018/0048673 | A1* | 2/2018 | Hunt | H04L 63/1425 |
| 2020/0195688 | A1* | 6/2020 | Prakash | G06F 16/955 |

OTHER PUBLICATIONS

Taylor, T. (2016). Using context to improve network-based exploit kit detection (Order No. 10146022). Available from ProQuest Dissertations and Theses Professional. (1828257791). Retrieved from https://dialog.proquest.com/professional/docview/1828257791?accountid=131444 (Year: 2016).*

Zhao.G.(2018).Domain-specific knowledge exploration with ontology hierarchical re-ranking and adaptive learning and extension(OrderNo. 10825522).Available fromProQuestDissertations &ThesesProfessional.(2071335980).Retrievedfrom https://dialog.proquest.com/professional/docview/2071335980?accountid=131444 (Year: 2018).*

European Search Report issued for European Patent Application No. 20193511.1, dated Dec. 22, 2020, 5 pages.

* cited by examiner

| Domain Filter | Edit Distance | Social Engineering |
|---|---|---|
| "domain": "nutrien-global.com",<br>"domain_tld": "com",<br>"domain_stripped": "nutrien-global",<br>"seed": "nutrien.com",<br>"n_gram_distance": {<br>    "bigram_distance": 0,<br>    "trigram_distance": 0,<br>    "quadgram_distance": 0,<br>    "quintgram_distance": 0,<br>    "sexgram_distance": 0,<br>    "bigram_match": 6,<br>    "trigram_match": 5,<br>    "quadgram_match": 4,<br>    "quintgram_match": 3,<br>    "sexgram_match": 2<br>} | "edit_distance": {<br>    "url": "nutrien-global.com",<br>    "seed": "nutrien.com",<br>    "levenshtein_distance_1": 0,<br>    "levenshtein_distance_2": 0,<br>    "is_confusable": 0,<br>    "is_bitsquatting": 0,<br>    "is_homoglyph": 0,<br>    "is_transposition": 0,<br>    "is_vowel_swap": 0,<br>    "is_repetition": 0,<br>    "is_hyphenation": 0,<br>    "is_qwerty_typo": 0,<br>    "is_addition": 1,<br>    "is_deletion": 0,<br>    "is_seed_string_present": 1,<br>    "levenshtein_distance": 6,<br>    "is_lookalike": 0,<br>    "match_root": "nutrien",<br>    "match_offset": 0,<br>    "match_length": 7<br>} | "social_engineering": {<br>    "GENERAL": [],<br>    "PHISHING": [],<br>    "URL_STRUCT": ["com"],<br>    "GEO": [],<br>    "NEGATIVE": [],<br>    "VERTICAL": [],<br>    "FIRST_NAME": [],<br>    "TPS": [],<br>    "FPS": [],<br>    "GENERAL_TLD": [],<br>    "PHISHING_TLD": [],<br>    "URL_STRUCT_TLD": ["com"],<br>    "GEO_TLD": [],<br>    "NEGATIVE_TLD": [],<br>    "VERTICAL_TLD": [],<br>    "TPS_TLD": [],<br>    "FPS_TLD": [],<br>    "DELIMITED": null,<br>    "AT_START": null,<br>    "COUNT_DASHES": 1,<br>    "COUNT_NONALPHA": 2,<br>    "NUMBERS_BEFORE": null,<br>    "NUMBERS_AFTER": null,<br>    "SEGMENTS": ["nutri", "en", "global"],<br>    "ROOT_IN_SEGMENT": 0<br>} |

*FIG. 2*

NATURAL LANGUAGE PROCESSING SYSTEMS AND METHODS FOR AUTOMATIC REDUCTION OF FALSE POSITIVES IN DOMAIN DISCOVERY

CROSS-REFERENCE TO RELATED APPLICATION(S)

This application claims a benefit of priority under 35 U.S.C. § 119(e) from U.S. Provisional Application No. 62/894,013, filed Aug. 30, 2019, entitled "NATURAL LANGUAGE PROCESSING SYSTEMS AND METHODS FOR AUTOMATIC REDUCTION OF FALSE POSITIVES IN DOMAIN DISCOVERY," which is fully incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates generally to network security and domain protection. More particularly, this invention relates to systems, methods, and computer program products that leverage natural language processing to automatically, programmatically, and significantly reduce false-positive domain name matches in a domain discovery process.

BACKGROUND OF THE RELATED ART

Bad actors such as cyber criminals can easily register domains that imitate an entity and/or a brand. Thus, for effective domain protection, it can be important to identify, detect, or otherwise uncover fraudulent domains that pose a risk to an entity or brand's domain. Currently, a domain discovery system, such as one available from Proofpoint, Inc., can continually analyze newly registered domains and discover domains, subdomains, and Universal Resource Locators (URLs) that represent a security, trademark, or other digital risk to a protected, entity-owned, or brand-owned domain (referred to herein as a "seed" domain).

Such a protected domain name can contain common words in English. Having common words in domain names can result in a large number of candidate domain names ("matches") that contain a string that matches exactly to a seed domain. However, not all the matches are indeed relevant to the seed domain. For example, for a seed domain "chase.com," a domain discovery system may find many matches, such as "chasingthesun.com" and "chasebank.com," as they all contain a common word "chase" that matches a text string, "chase," in the seed domain, "chase.com." However, the word "chase" in the context of the sentence "chasing the sun" is not relevant to the seed domain "chase.com." This non-relevant match is an example of a false positive that a domain discovery system may produce as a result of a domain discovery process.

As the number of domains on the Internet continues to increase exponentially (e.g., currently about 400 million and up), such false positives can affect the accuracy and performance of a domain discovery system. Accordingly, there is a need to reduce false positives of matches produced by a domain discovery system. Embodiments disclosed herein can address this need and more

SUMMARY OF THE DISCLOSURE

Embodiments disclosed herein can be useful for analyzing results from a domain discovery system and significantly reducing false positives of matches produced by the domain discovery system. A goal of the invention disclosed herein is to improve the domain discovery system's performance by enhancing the domain discovery system's ability in identifying and removing false positives in the matches thus produced so as to generate a final result set of matches with significantly less false positives. The final result set can be reported, presented via a user interface, and/or provided as input to another computing facility.

In some embodiments, this goal can be accomplished by leveraging natural language processing ("NLP") to automatically, programmatically, and significantly reduce false-positive domain name matches in a domain discovery process. In some embodiments, a domain discovery engine or a rules engine is adapted for applying NLP rules to discovered domain names and determining how a seed domain string is used in a match (e.g., as a verb, a noun, a denominal verb, a verbal noun, or a gerund, etc.). Based on this finding, a decision can be made as to whether a match found through the domain discovery process is a false positive or is actually relevant to the seed domain.

In some embodiments, a method for automatically reducing false positives in a domain discovery process can include analyzing a match produced by a domain discovery system (e.g., as an output from a domain discovery process), the match comprising a domain name determined by the domain discovery system as matching a seed domain; excluding a top-level domain (TLD) from the match; extracting a sequence of segments from the match exclusive of the TLD; assigning a lexical category to each segment of the sequence of segments; determining a segment of the sequence of segments that is the closest to the seed domain string using fuzzy string matching; comparing the lexical category of the segment of the sequence of segments that is closest to the seed domain string with a lexical category of the seed domain string; determining whether the match is relevant to the seed domain based on the comparing; in response to a determination that the match is not relevant to the seed domain, identifying the match produced by the domain discovery system as a false positive; and automatically removing the false positive from a set of matches produced by the domain discovery system for the seed domain.

In some embodiments, each match produced by the domain discovery system as matching the seed domain is processed by the rules engine for a NLP-based false-positive analysis disclosed herein. A clustering technique can be used to cluster relevant matches or separate relevant matches from non-relevant matches. The rules engine can produce a final result set as input to a downstream computing facility. Additionally or alternatively, the final result set can be presented on a user interface.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 2 shows by example data generated by the domain discovery system of FIG. 1 according to some embodiments disclosed herein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As alluded to above, embodiments disclosed herein can be useful for analyzing results from a domain discovery system and significantly reducing false positives of matches produced by the domain discovery system. A non-limiting example of a domain discovery system suitable for implementing the invention disclosed herein is illustrated in FIG. 1.

Figure 1:
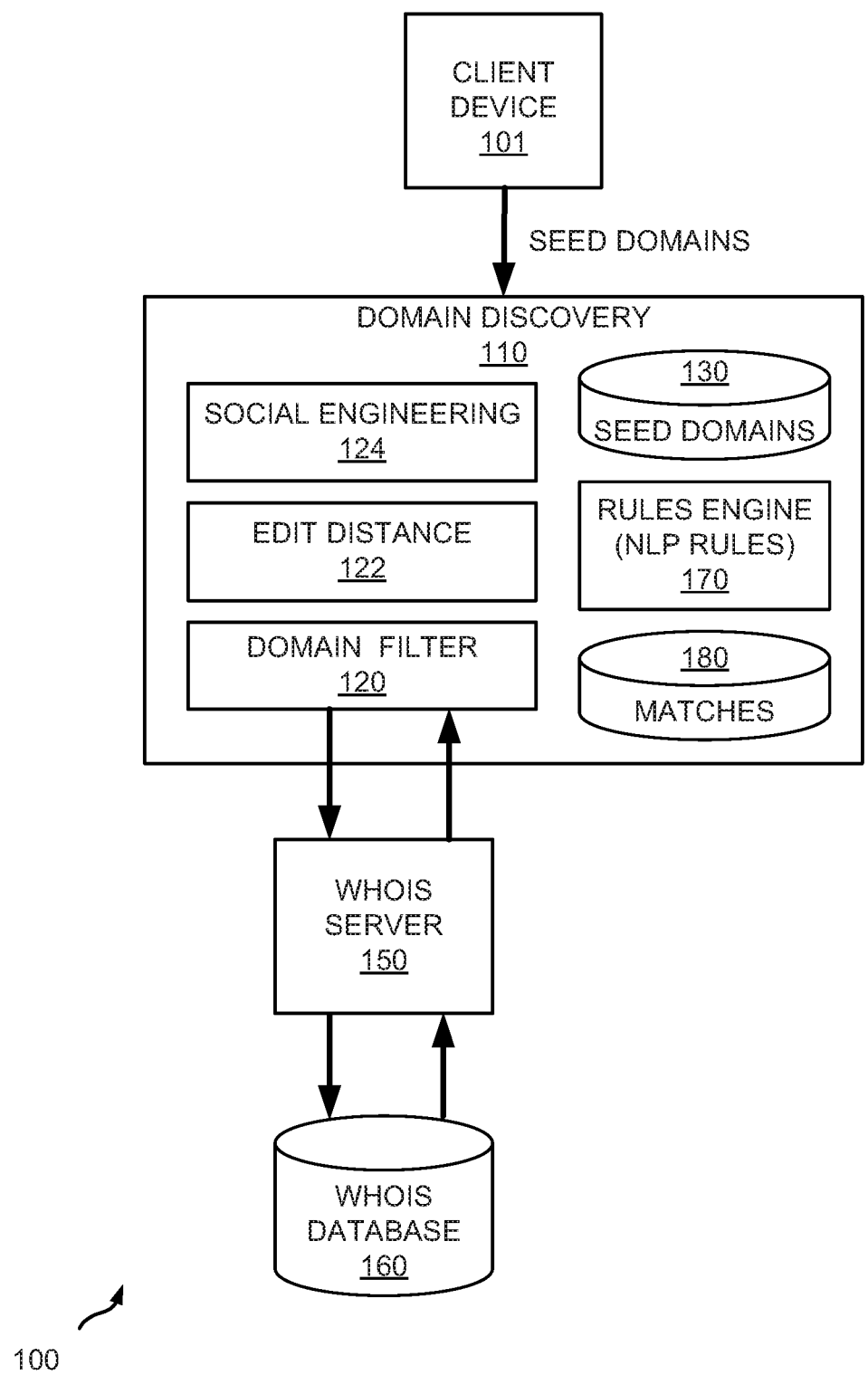
FIG. 1 depicts a diagrammatic representation of a domain discovery system operating in a distributed computing environment, the domain discovery system having a rules engine adapted for automatically reducing false positives of seed domain matches according to some embodiments disclosed herein.

As illustrated in FIG. 1, a domain discovery system 110 operating in a distributed computing environment 100 may comprise a processing pipeline for processing domain names relative to a seed domain. In the example shown in FIG. 1, the processing pipeline includes a domain filter 120, an edit distance module 122, and a social engineering module 124. Although not shown in FIG. 1, the processing pipeline may also include a Bloom filter for network security and/or efficiency purposes. Bloom filters are known to those skilled in the art and thus are not further described herein.

FIG. 2 shows by example data generated by domain filter 120, edit distance module 122, and social engineering module 124 according to some embodiments disclosed herein. The example of FIG. 2 shows a seed domain "nutrient.com".

In this disclosure, a "seed domain" refers to a domain name of interest, e.g., a domain name owned by a brand or an entity. "iCloud.net" is an example of a domain name that is owned by the brand known as "Apple®" which, in turn, is own by the entity known as "Apple Inc."

In the example of FIG. 1, domain discovery system 110 resides on a server computer (or distributed over multiple server machines) and is communicatively connected to client device(s) 101. In some embodiments, domain discovery system 110 is operable to receive or obtain seed domains from client device 101 and store them in database 130.

As shown in FIG. 1, domain filter 120 is adapted for processing domain names obtained from WHOIS server 150. WHOIS is a query and response protocol for querying WHOIS databases (e.g., WHOIS database 160) that store domain registration information such as a domain name, an Internet Protocol (IP) address block, or an autonomous system. WHOIS server 150 is configured to, responsive to a WHOIS query, access WHOIS database 160, retrieve records that match the WHOIS query, and return publicly available domain registration information such as the contact person(s) and technical configuration for the requested domain. If the domain registration information was made private by the registrant, WHOIS server 150 returns a generic listing of the registrar and not the specifics of the contact person(s) for the requested domain. Currently, WHOIS databases collectively contain over 400 million domain names.

An authorized user (e.g., an employee of the brand or the entity owning the brand, an administrator of a domain discovery system, etc.) may provide a seed domain through a user interface (e.g., a user interface of domain discovery system 110). In some embodiments, responsive to the receipt of a new seed domain (e.g., "chase.com"), the domain discovery system is operable to detect, discover, or otherwise find candidate domain names (i.e., "matches") that match the seed domain.

In some embodiments, the domain discovery system is operable to perform the following matching functions:
  Full match: This can entail searching the WHOIS data for a full match of a registrant's domain name registration information such as the registrant's email address, a technical email address, an administrative email address, a contact email address, a phone number, a fax number, a street address, etc.
  Fuzzy match: This can entail searching the WHOIS data for a fuzzy match of the registrant's name, the registrant's organization (or brand or company) name. A brand can have multiple business entities across different geo locations. Each entity can have different business structure such as "LLC," "LTD," "Inc.," "GMBH," etc. Unlike a full match which requires an exact match of each character in a string, a fuzzy match is based on a string meeting a fuzzy match threshold which is based on the length of the string (e.g., the number of characters in the string) and the matching ratio (e.g., 9 out of 10 characters in a candidate domain registrant's name match the seed domain registrant's name).

Domain match: This can entail parsing WHOIS field(s) and extracting a domain name from a candidate domain registrant's email address, technical email address, administrative email address, contact email address, name servers, etc.

In some embodiments, to avoid false positives, the domain discovery system may consider a match found if at least two full matches can be found or if at least one fuzzy match/domain match and one full match can be found. If the domain discovery system cannot find any matches using WHOIS data points, it may perform an infrastructure data matching procedure that includes the following matching functions:

Full match: This can entail fully matching an IP address, an Autonomous System Number (ASN), an organization controlling the ASN, a secure sockets layer (SSL) certificate subject, a subject alternate name, mail exchange (MX) record, etc.

Configuration parameter match: This can entail fully matching a user-provided (for instance, through a user interface) configuration parameters (or registration parameters) such as a full email address, IP address, IP address range, ASN, etc. with those found in infrastructure data obtained from various sources (e.g., an infrastructure data source or an Internet resource). In some embodiments, the domain discovery system may parse the user-provided email address to extract a candidate domain name and compare the candidate domain name thus extracted with the seed domain.

The infrastructure data matching procedure does not consider fuzzy matches. Rather, a match is considered found through the infrastructure data matching procedure only if a full match can be found.

For every domain name detected/matched with a seed domain, the domain discovery system is capable of analyzing how many characters the domain name matches the seed domain, where in the domain name did the match start, how many additional characters were added to the domain name as compared to the seed domain, how many characters were removed as compared to the seed domain, whether a vowel was swapped as compared to the seed domain, and so on.

The domain discovery system is configured for performing these and other analyses on each domain name that comes into the system. Additional details and example functions of the domain discovery system can be found in U.S. patent application Ser. No. 16/244,955, filed on Jan. 10, 2019, entitled "SYSTEMS AND METHODS FOR DISCOVERY OF BRAND-REGISTERED DOMAIN NAMES," which is fully incorporated by reference herein.

As a non-limiting example, the analyses performed by the domain discovery system can produce about 50-60 data points (also referred to as parameters or features) for each domain name thus analyzed by the domain discovery system. These data points can be leveraged in combination with each other or independently of each other for reducing (e.g., filtering out) certain domain names detected by the domain discovery system that may not be very relevant to a seed domain.

For example, suppose "moonlighting.com" is a seed domain for people looking for second jobs. The term "moonlight" is not relevant to this seed domain in this particular context. However, there is a substantial overlap between these two terms. This means that it is possible that many domain names containing the term "moonlight" will be detected by the domain discovery system. In such a case, the domain discovery system can suppress detection of domain names containing the term "moonlight" by identifying the string "moonlight" (with three characters "ing" removed as compared with the seed domain string "moonlighting") as a default false positive for the seed domain string "moonlighting."

Additional examples of data points, which can be generated, derived, or otherwise obtained by the domain discovery system as each domain name is processed through the processing pipeline, can include the edit distance between a domain name and a seed domain from the edit distance module, the first name of a person through the social engineering module, registration information from the WHOIS server (e.g., a registrant's domain name registration information such as the registrant's email address, a technical email address, an administrative email address, a contact email address, a phone number, a fax number, a street address, etc.), and so on. For the purpose of illustration, a non-limiting example list of data points is provided below.

{
  "registrantName": "",
  "registrantCity": "",
  "registrantStreet": "",
  "registrantCountry": "",
  "registrantState": "",
  "registrantTelephone": "",
  "registrantEmail": "",
  "registrantOrganization": "",
  "registrantPostalCode": "",
  "domainName": "nutrien-global.com",
  "NameserverhostNames":
"NS09.DOMAINCONTROL.COM|NS10.DOMAINCONTROL.COM|",
  "NameserverIps": "",
  "estimatedDomainAge": 20,
  "createdDate": "2019-03-12",
  "expiresDate": "2020-03-12",
  "updatedDate": "2019-03-19",
  "registrarName": "xxx.com, LLC",
  "levenshtein_distance_1": 0,
  "levenshtein_distance_2": 0,
  "is_confusable": 0,
  "is_bitsquatting": 0,
  "is_homoglyph": 0,
  "is_transposition": 0,
  "is_vowel_swap": 0,
  "is_repetition": 0,
  "is_hyphenation": 0,
  "is_qwerty_typo": 0,
  "is_seed_string_present": 1,
  "levenshtein_distance": 6,
  "pageTitle": "",
  "responseSize": 469,
  "randomSubdomainCheck": 0,
  "parkURLInPage": 0,
  "webCategory": "Uncategorized",
  "surblCheck": 0,
  "externalFeeds": 0,
  "ssdeep":
"12:Sto/KHxVAC59mRCf4lzJ/5eZu+YQKCGD4Kzb0nz:Sto/
WHAiuUH8ZunR5/bSz",
  "emerging": 0,
  "ipASN": 26496,
  "ipOwner": "AS-26496-xxx-COM-LLC - xxx.com, LLC, US",
  "ipPrefix": "xxx. 168.220.0/22",
  "ipCC": " US",
  "ipExists": 1,
  "match_offset": 0,
  "match_length": 7,
  "match_root": "nutrien",

```
"seed": "nutrien.com",
"NEGATIVE": [ ],
"FPS": [ ],
"URL_STRUCT": [
   "com"
],
"NUMBERS_BEFORE": null,
"NUMBERS_AFTER": null,
"TPS": [ ],
"GEO": [ ],
"DELIMITED": null,
"VERTICAL": [ ],
"GENERAL": [ ],
"efdCheck": 1,
"disposableEmail": 0,
"freeEmail": 0,
"AT_START": null,
"PHISHING": [ ],
"phishing_urls": [ ],
"COUNT_NONALPHA": 2,
"FPS_TLD": [ ],
"URL_STRUCT_TLD": [
   "com"
],
"TPS_TLD": [ ],
"VERTICAL_TLD": [ ],
"COUNT_DASHES": 1,
"GENERAL_TLD": [ ],
"GEO_TLD": [ ],
"PHISHING_TLD": [ ],
"NEGATIVE_TLD": [ ],
"domain_stripped": "nutrien-global",
"seed_tld": "nutrien",
"seed_stripped": "nutrien",
"domain_tld": "com",
"technicalContact_email": "",
"standardRegCreatedDate": "2019-03-12",
"standardRegUpdatedDate": "2019-03-19",
"standardRegExpiresDate": "2020-03-12",
"matchratio": 0.6666666666666666,
"FIRST_NAME": [ ],
"urlhistory": [
   "http://nutrien-global.com/",
   "http://nutrien-global.com/WQSmZ/",
   "http://nutrien-global.com/",
   "http://nutrien-global.com/TdgdZ/",
   "http://nutrien-global.com/VbOkZ/TdgdZ/",
   "http://nutrien-global.com/TdgdZ/"
],
"finalIPAddress": "xxx.63.202.55",
"dnsIPAddress": "xxx.168.221.63",
"trigram_distance": 0,
"quintgram_distance": 0,
"bigram_distance": 0,
"sexgram_distance": 0,
"quadgram_distance": 0,
"is_lookalike": 0,
"trigram_match": 5,
"quintgram_match": 3,
"bigram_match": 6,
"sexgram_match": 2,
"quadgram_match": 4,
"urldbScore": 100,
"ruleid": "8.5",
"seedEmail": "",
"seedOrg": "",
"idnaDomain": "",
"idnaDomain_stripped": "",
"idnaDomain_tld": "",
"originalDomain": "",
"originalDomain_stripped": "",
"originalDomain_tld": "",
"mxrecords": "nutrienglobal-com01i.mail.protection.outlook.com.",
"lastUpdateSinceDays": 13,
"domainCreateDays": 20,
"domainRegisterPeriodDays": 366,
"ROOT_IN_SEGMENT": 0,
"SEGMENTS": [
   "nutri",
   "en",
   "global",
   "com",
   "com"
],
"nbRuleid": 1.2,
"isForm": 0,
"isUser": 0,
"isPass": 0,
"isMXrecord": 1,
"webStatus": "200",
"score": 0,
"url_phishing_classification": { },
"results_url_target": [ ],
"results_logo_detection": { },
"url": "",
"customer": "prod-us-east-2_444",
"results_ner_detection": [ ],
"miner_request_id": 0,
"target": "",
"verified": "",
"source": "",
"ingestionDate": 1554076800,
"runid": "42f8b8a8c6acf90469e138bbf6e00038",
"discountString": 0,
"administrativeContact_email": "",
"gaTrackerId": [ ],
"certificate": "",
"privateCheck": false,
"configSegments": [ ],
"configNecessarySegments": [ ],
"configNonUniqueMeanings": [ ],
"categories": [
   8
],
"edit_distance": 0,
"serverBanner": {
   "Cache-Control": "no-cache",
   "Pragma": "no-cache",
   "Content-Type": "text/html; charset=utf-8",
   "Content-Encoding": "gzip",
   "Expires": "-1",
   "Vary": "Accept-Encoding",
   "Server": "Microsoft-IIS/7.5",
   "X-AspNet-Version": "4.0.30319",
   "X-Powered-By": "ASP.NET",
   "Date": "Mon, 01 Apr 2019 18:32:43 GMT",
   "Content-Length": "444",
   "Age": "8",
   "Connection": "keep-alive"
},
"suspicious_ignore": true,
"sslExpiryDate": "",
"brand": "",
"brand_url": "",
"privacy_flag": "Not Applicable",
"screenshot_audit": {
   "taken": false,
   "exists": true,
   "reason": "SSDEEP_FAILED",
   "failed": false,
   "message": {
      "screenshot": {
         "timestamp": 1552928608,
         "s3_bucket": "proofpoint-dts-prod-screenshots-us-west-2",
         "s3_key": "com/nutrien-global/1552928608.png",
         "s3_path": "s3://proofpoint-dts-prod-screenshots-us-west-2/com/nutrien-global/1552928608.png",
         "dimensions": {
            "scale": 1,
            "width": "1440",
            "height": "900"
         },
         "md5": "b2dd3fd1c4654361f4536ef4c503e952"
      }
   }
},
"dnsIPs": [
   "184.168.221.63"
```

-continued

```
],
"contactEmail": "abuse@xxx.com",
"logo_flag": 0,
"logos": [
    "e5ef41785bb501b39fcf5bfa7ee845e0"
],
"resp_logo": [
    {
        "base_image": "com/nutrien-global/1552928608.png",
        "base_keypoints": 1354,
        "result": [
            {
                "image": "e5ef41785bb501b39fcf5bfa7ee845e0",
                "keypoints": 324,
                "distribution": {
                    "319": 3,
                    "314": 1,
                    "318": 7,
                    "83": 1,
                    "147": 1,
                    "299": 1,
                    "323": 4,
                    "321": 4
                },
                "x_distance": 513.7364501953125,
                "y_distance": 619.0052947998047,
                "inline_match": 9,
                "matched": 22,
                "adjacent_keypoint_consistency": 0.2777777777777778
            }
        ]
    }
],
"screen_height": 900,
"screen_width": 1440,
"sender_domain": true,
"et_ip_events": 0,
"counterfeit_check": false,
"streaming": 0,
"domain_reseller": 0,
"parking_crew": 0,
"under_construction": 0,
"first_detection": "2019-03-13",
"last_detection": "2019-04-01",
"sc_project": [ ],
"sc_invisible": [ ],
"sc_security": [ ],
"convict": 1,
"state": 1,
"scam_check": 0,
"premium_flag": true
}
```

Matches (i.e., candidate domains that match a seed domain) found, discovered, or otherwise produced by the domain discovery system (regardless of how they were received or obtained) can be stored in a database of the domain discovery system (e.g., matches stored in a database 180 of domain discovery system 110). In embodiments disclosed herein, the processing pipeline that makes up the domain discovery process is extended or augmented with additional NLP-based processing of matches 180.

As alluded to above, a goal of the invention disclosed herein is to improve the domain discovery system's performance by enhancing the domain discovery system's ability in identifying and removing false positives in the matches thus produced. Particularly, in embodiments disclosed herein, a rules engine (e.g., rules engine 170) is adapted for applying NLP-based rules to matches 180 to separate relevant matches from false positives analysis so as to produce a final set of relevant matches with significantly less false positives. The final result set can be reported, presented via a user interface, and/or provided as input to another computing facility.

In some embodiments, rules engine 170 is adapted for applying NLP rules to matches 180 (i.e., domain names discovered as matching a seed domain) and determining how a seed domain string is used in a match (e.g., as a verb, a noun, a denominal verb, a verbal noun, or a gerund, etc.).

The invention disclosed herein can be particularly useful when a seed domain is or includes a very common verb or noun. This is because, when the seed domain is or contains a very common verb or noun, the domain discovery system may find many what appears to be relevant matches.

For example, suppose "chase.com" is a seed domain. In this case, the word "chase" can be used as a verb or a noun. Because "chase.com" refers to a financial institution, matches with the word "chase" used as a noun would be more relevant to the seed domain than matches with the word "chase" used as a verb. For instance, in matches "chasingthesun.com," "ichasethewolves.com," "childrenwhochaselostvoices.com," "chasethepopcorn.com," "chasethewoods.com," "chasefuturestars.com," etc., the word "chase" is used as a verb. These seemingly "relevant" matches are actually false positives because they are not relevant to the seed domain "chase.com" in which the word "chase" is used as a noun.

As another example, the word "sprint" can be used as a verb or a noun. With a seed domain "sprint.com" referring to a telecommunications company, matches containing the word or string "sprint" (which is also referred to herein as a "seed domain string") as a noun are more relevant than matches containing the word or string "sprint" as a verb.

In some embodiments, rules engine 170 is adapted for utilizing a Natural Language Toolkit (NLTK) to understand how a seed domain string is used inside a domain name. NLTK refers to a platform for building Python programs to work with human language data. It provides lexical resources such as WordNet and includes text processing libraries for classification, tokenization, stemming, tagging, parsing, and semantic reasoning, wrappers for NLP libraries. Other NLP tools and libraries may also be used. Understanding how a seed domain string is used inside each matching domain name (e.g., as a verb, noun, or other lexical categories) allows rules engine 170 to make a decision on automatic removal of irrelevant domain names from being associated with the seed domain.

Figure 3:
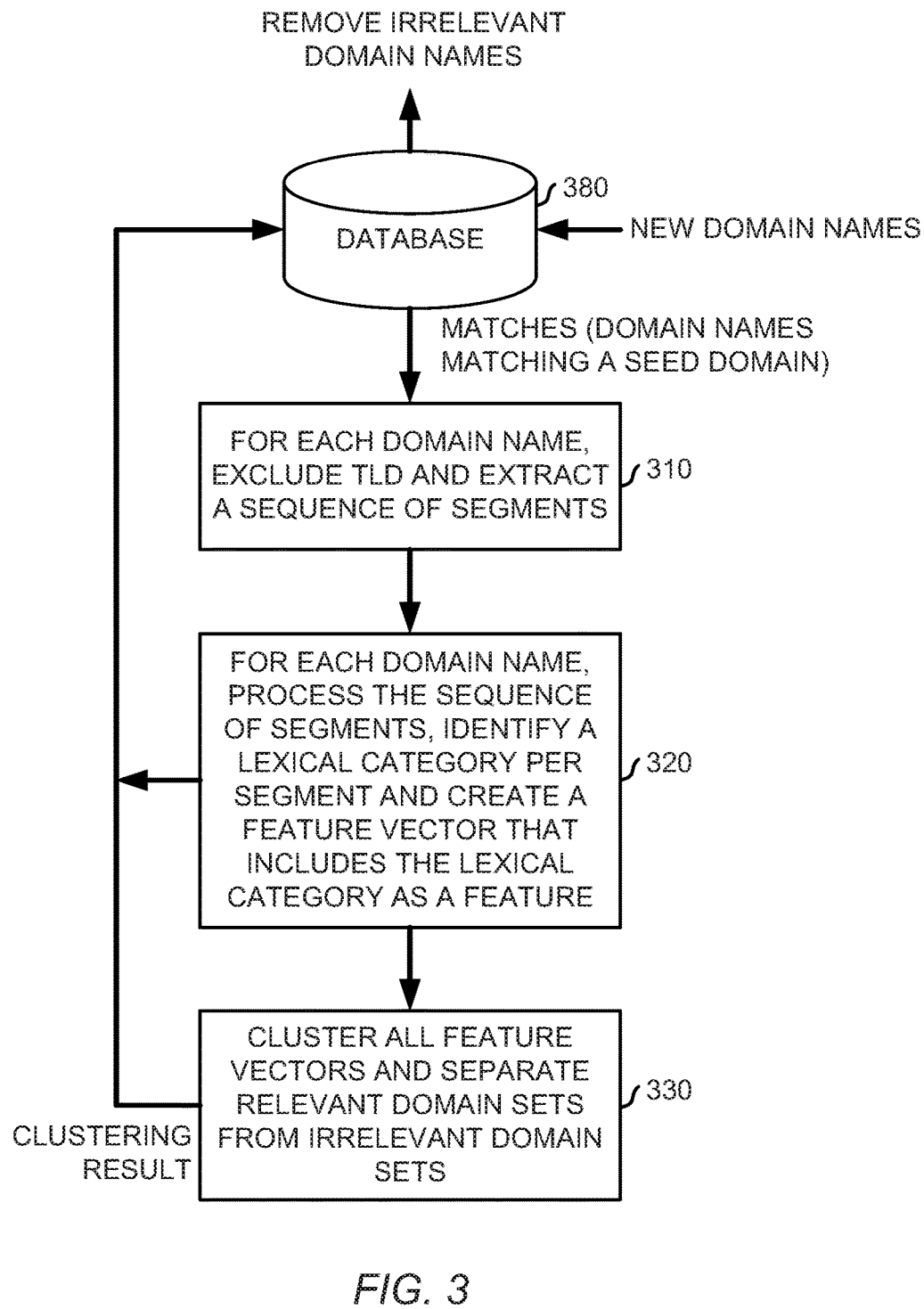
FIG. 3 is a flow diagram illustrating an example of automatic reduction of false positives of seed domain matches according to some embodiments disclosed herein.

FIG. 3 is a flow diagram illustrating an example of automatic reduction of false positives of seed domain matches according to some embodiments disclosed herein. In the example of FIG. 3, a flow 300 shows that a database 380 is continually updated with new domain names. Each domain name is processed through the processing pipeline (e.g., inclusive of a domain filter, an edit distance module, and a social engineering module) described above. As a non-limiting example, database 380 may store about 400 million or more domain names.

For each domain name in database 380 that matches a seed domain, the TLD (e.g., ".com" for commercial sites, ".gov" for governmental sites, etc.) is excluded and a sequence of segments is extracted (310). Using "chasingthesun.com" as an example of a match for a seed domain "chase.com", the TLD for "chasingthesun.com" is ".com" and excluding ".com" results in a string "chasingthesun."

Next, the sequence of segments for each domain name is processed and a lexical category is assigned to each segment (320). Following the example above, the string "chasingthesun" represents a sequence of segments "chasing," "the," "sun." A lexical category can be identified and assigned for each segment utilizing NLP rules. Lexical categories refer to classes of words (e.g., noun, verb, preposition), which differ in how other words can be constructed out of them. In this case, each segment is considered a lexical item. The lexical category of a lexical item can be defined by the syntactic or morphological behavior of the lexical item under evaluation (e.g., as a noun or a verb). Such NLP rules can be defined using the NLTK library. The lexical category is determined depending upon the role of the seed domain string "chase" in the context of the domain name "chasingthesun." In this context, the seed domain string "chase" is used in the context of the domain name "chasingthesun" as a verb. Thus, the lexical category of "verb" is assigned to the lexical item "chasing."

In embodiments disclosed herein, such a lexical category, which can be one of the features in a vector of features associated with the domain name, is utilized as an indicator to identify irrelevant domain names which are then removed further investigation. That is, at the end of the processing pipeline, the lexical category can serve as a condition in determining whether to keep a domain name associated with a seed domain or drop it as a false positive.

Removing such a domain name from a set of matches found by the domain discovery system is not an easy task even for human reviewers. One reason is that many matches can contain the exact same seed domain string as the seed domain. For example, "ichasethewolves.com," "childrenwhochaselostvoices.com," "chasethepopcorn.com," "chasethewoods.com," "chasefuturestars.com," etc. all contain the exact same seed domain string "chase" as the seed domain "chase.com." Since these matches contain the exact same seed domain string as the seed domain, human reviewers often overlook the context of how the seed domain string is used in each match.

Further, prior domain discovery systems did not have the ability to understand or comprehend that, although they contain the same characters that make up the same seed domain string, such matches are different from the seed domain in the context of how the seed domain string is used. Lacking this ability, prior domain discovery systems could not automatically remove these seemingly "relevant" matches that are actually false positives.

With the rules engine described above, the lexical category of the seed domain string "chase" had already been assigned through a separate NLP process. Further, the rules engine can apply NLP rules defined using the NLTK library to each match and determine, for each match, the correct context of the seed domain string "chase" used in the respective match and assign a lexical category accordingly. For instance, the rules engine can run the NLTK library on a match "chasethepopcorn" and determine that the correct context of "chase" in "chasethepopcorn" is that the common word "chase" is used as a verb. Accordingly, the lexical category "verb" is assigned to "chase" for the match "chasethepopcorn." Taking this outcome from the NLTK library, the rules engine can determine that, for domain protection purposes, the match "chasethepopcorn" is not relevant to the seed domain "chase.com" in which the word "chase" is used as a noun in the seed domain.

In some embodiments, the rules engine may process each match for a seed domain as described above and include the lexical category for the seed domain string in a respective match as a feature in a feature vector generated using the NLTK library. This new feature is in addition to the features produced by a wide variety of NLP tasks. Leveraging the lexical category for the seed domain string in each respective match, a clustering technique can be used to separate relevant matches from non-relevant matches. For example, matches containing a seed domain string having the same lexical category as the seed domain string in the seed domain can be clustered together to produce a final result set. Any suitable clustering technique can be utilized. The final result set of matches can be provided as input to a downstream computing facility (e.g., downstream from the rules engine) and/or presented on a user interface.

The final result set can be shown with or without false positives (non-relevant matches) thus identified. Table 1 below shows an example in which relevant matches are shown with irrelevant matches (false positives) of the seed domain "chase.com."

TABLE 1

| Is Relevant | Domain | seed | lexical category |
| --- | --- | --- | --- |
| no | chaseaclassic.com | chase.com | verb |
| no | chaseamobuser.ml | chase.com | verb |
| yes | chaseandpleasure.de | chase.com | noun |
| yes | chasebusinessbanking.org | chase.com | noun |

Figure 4:
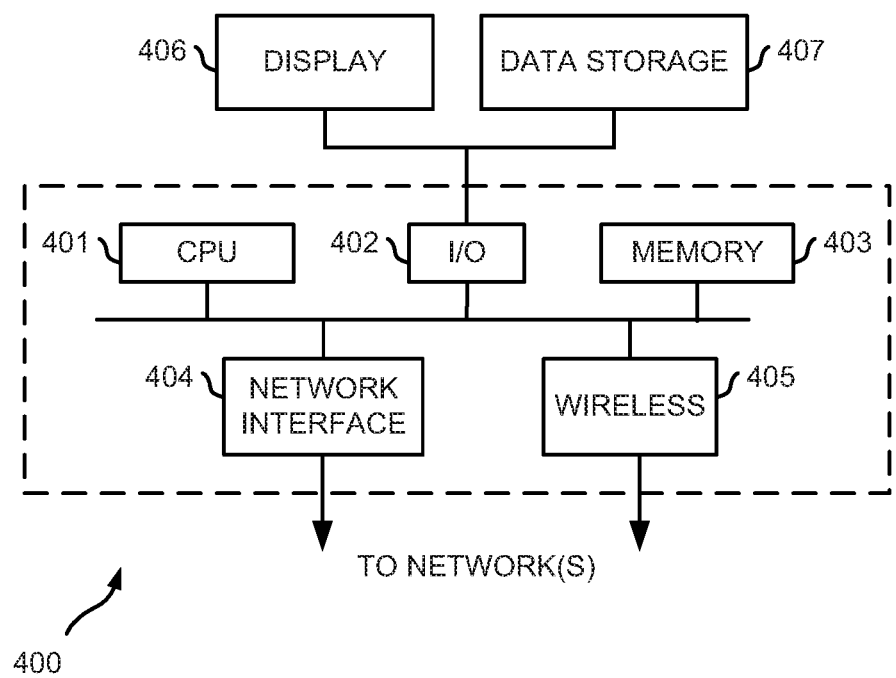
FIG. 4 depicts a diagrammatic representation of a data processing system for automatically reducing false positives of seed domain matches according to some embodiments disclosed herein.

FIG. 4 depicts a diagrammatic representation of a data processing system for automatically reducing false positives of seed domain matches according to some embodiments disclosed herein. As shown in FIG. 4, data processing system 400 may include one or more central processing units (CPU) or processors 401 coupled to one or more user input/output (I/O) devices 402 and memory devices 403. Examples of I/O devices 402 may include, but are not limited to, keyboards, displays, monitors, touch screens, printers, electronic pointing devices such as mice, trackballs, styluses, touch pads, or the like. Examples of memory devices 403 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 400 can be coupled to display 406, information device 407 and various peripheral devices (not shown), such as printers, plotters, speakers, etc. through I/O devices 402. Data processing system 400 may also be coupled to external computers or other devices through network interface 404, wireless transceiver 405, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer-readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc.

Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for automatically reducing false positives in a domain discovery process, the method comprising:
    analyzing, by a rules engine, a match produced by a domain discovery system, the match comprising a domain name determined by the domain discovery system as matching a seed domain, the seed domain having a seed domain string;
    extracting, by the rules engine utilizing a natural language processing (NLP) library, a sequence of segments from the match, wherein the extracting excludes a top-level domain (TLD) of the domain name;
    assigning, by the rules engine utilizing the NLP library, a lexical category to each segment of the sequence of segments;
    determining, by the rules engine through fuzzy string matching, a segment of the sequence of segments that is closest to the seed domain string;
    comparing, by the rules engine, the lexical category of the segment of the sequence of segments that is closest to the seed domain string with a lexical category of the seed domain string;
    determining, by the rules engine based on the comparing, whether the match is relevant to the seed domain;
    in response to a determination by the rules engine that the match is not relevant to the seed domain, identifying, by the rules engine, the match produced by the domain discovery system as a false positive; and
    automatically removing the false positive from a set of matches produced by the domain discovery system for the seed domain.

2. The method according to claim 1, further comprising:
    performing the analyzing, the extracting, the assigning, the determining, and the comparing for each match of the set of matches;
    clustering non-relevant matches in the set of matches, wherein the non-relevant matches are determined by the rules engine as not being relevant to the seed domain; and
    removing the non-relevant matches thus clustered from the set of matches.

3. The method according to claim 1, further comprising:
    prior to the extracting, excluding the TLD from the domain name of the match determined by the domain discovery system as matching the seed domain.

4. The method according to claim 1, wherein the automatically removing the false positive from the set of matches comprises dissociating the false positive and the seed domain.

5. The method according to claim 4, further comprising:
    dissociating false positives identified by the rules engine from being associated with the seed domain, the dissociating producing a final result set of relevant matches for the seed domain.

6. The method according to claim 5, further comprising:
    providing the final result set of relevant matches for the seed domain to a user interface or as input to a computing facility downstream from the rules engine.

7. The method according to claim 1, wherein each match of the set of matches produced by the domain discovery system for the seed domain contains a segment that is identical to the seed domain string.

8. A system for automatically reducing false positives in a domain discovery process, the system comprising:
    a processor;
    a non-transitory computer-readable medium; and
    stored instructions translatable by the processor for:
        analyzing a match produced by the domain discovery process, the match comprising a domain name that matches a seed domain, the seed domain having a seed domain string;
        extracting, utilizing a natural language processing (NLP) library, a sequence of segments from the match, wherein the extracting excludes a top-level domain (TLD) of the domain name;
        assigning, utilizing the NLP library, a lexical category to each segment of the sequence of segments;
        determining, through fuzzy string matching, a segment of the sequence of segments that is closest to the seed domain string;
        comparing the lexical category of the segment of the sequence of segments that is closest to the seed domain string with a lexical category of the seed domain string;
        determining, based on the comparing, whether the match is relevant to the seed domain;
        in response to a determination that the match is not relevant to the seed domain, identifying the match produced by the domain discovery process as a false positive; and
        automatically removing the false positive from a set of matches produced by the domain discovery process for the seed domain.

9. The system of claim 8, wherein the stored instructions translatable by the processor for:
    performing the analyzing, the extracting, the assigning, the determining, and the comparing for each match of the set of matches;

clustering non-relevant matches in the set of matches, wherein the non-relevant matches are determined by the rules engine as not being relevant to the seed domain; and removing the non-relevant matches thus clustered from the set of matches.

10. The system of claim 8, wherein the stored instructions translatable by the processor for:

prior to the extracting, excluding the TLD from the domain name of the match determined by the domain discovery system as matching the seed domain.

11. The system of claim 8, wherein the automatically removing the false positive from the set of matches comprises dissociating the false positive and the seed domain.

12. The system of claim 11, wherein the stored instructions translatable by the processor for:

performing the dissociating for each of the set of matches determined as not being relevant to the seed domain to thereby produce a final result set of relevant matches for the seed domain.

13. The system of claim 12, wherein the stored instructions translatable by the processor for:

providing the final result set of relevant matches for the seed domain to a user interface or as input to a computing facility.

14. The system of claim 8, wherein each match of the set of matches produced by the domain discovery process for the seed domain contains a segment that is identical to the seed domain string.

15. A computer program product comprising a non-transitory computer-readable medium storing instructions translatable by a processor to perform:

analyzing a match produced by a domain discovery process, the match comprising a domain name that matches a seed domain, the seed domain having a seed domain string;

extracting, utilizing a natural language processing (NLP) library, a sequence of segments from the match, wherein the extracting excludes a top-level domain (TLD) of the domain name;

assigning, utilizing the NLP library, a lexical category to each segment of the sequence of segments;

determining, through fuzzy string matching, a segment of the sequence of segments that is closest to the seed domain string;

comparing the lexical category of the segment of the sequence of segments that is closest to the seed domain string with a lexical category of the seed domain string;

determining, based on the comparing, whether the match is relevant to the seed domain;

in response to a determination that the match is not relevant to the seed domain, identifying the match produced by the domain discovery process as a false positive; and automatically removing the false positive from a set of matches produced by the domain discovery process for the seed domain.

16. The computer program product of claim 15, wherein the instructions translatable by the processor for:

performing the analyzing, the extracting, the assigning, the determining, and the comparing for each match of the set of matches;

clustering non-relevant matches in the set of matches, wherein the non-relevant matches are determined by the rules engine as not being relevant to the seed domain; and removing the non-relevant matches thus clustered from the set of matches.

17. The computer program product of claim 15, wherein the stored instructions translatable by the processor for:

prior to the extracting, excluding the TLD from the domain name of the match determined by the domain discovery system as matching the seed domain.

18. The computer program product of claim 15, wherein the automatically removing the false positive from the set of matches comprises dissociating the false positive and the seed domain.

19. The computer program product of claim 15, wherein the instructions translatable by the processor for:

performing the dissociating for each of the set of matches determined as not being relevant to the seed domain to thereby produce a final result set of relevant matches for the seed domain; and providing the final result set of relevant matches for the seed domain to a user interface or as input to a computing facility.

20. The computer program product of claim 15, wherein each match of the set of matches produced by the domain discovery process for the seed domain contains a segment that is identical to the seed domain string.

\* \* \* \* \*